(12) United States Patent
Oh

(10) Patent No.: US 10,106,119 B2
(45) Date of Patent: Oct. 23, 2018

(54) CURTAIN AIRBAG FOR VEHICLE

(71) Applicants: Hyundai Motor Company, Seoul (KR); Kia Motors Corp., Seoul (KR)

(72) Inventor: Chang Jin Oh, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 15/333,396

(22) Filed: Oct. 25, 2016

(65) Prior Publication Data

US 2017/0355343 A1 Dec. 14, 2017

(30) Foreign Application Priority Data

Jun. 8, 2016 (KR) .................. 10-2016-0070690

(51) Int. Cl.
*B60R 21/232* (2011.01)
*B60R 21/21* (2011.01)
*B60R 21/2338* (2011.01)

(52) U.S. Cl.
CPC ............ *B60R 21/232* (2013.01); *B60R 21/21* (2013.01); *B60R 21/2338* (2013.01)

(58) Field of Classification Search
CPC .............. B60R 21/232; B60R 21/2338; B60R 21/2334; B60R 21/231; B60R 2021/23382; B60R 2021/23386; B60R 2021/23308; B60R 2021/23566; B60R 2021/23571
See application file for complete search history.

(56) References Cited

U.S. PATENT DOCUMENTS

| | | | | |
|---|---|---|---|---|
| 5,730,464 A * | 3/1998 | Hill | ............ | B60R 21/23138 280/730.2 |
| 6,457,745 B1 * | 10/2002 | Heigl | ............ | B60R 21/232 280/728.1 |
| 7,121,584 B2 * | 10/2006 | Hasebe | ............ | B60R 21/233 280/743.2 |
| 7,549,672 B2 * | 6/2009 | Sato | ............ | B60R 21/207 280/729 |
| 7,828,322 B2 * | 11/2010 | Breuninger | ............ | B60R 21/231 280/730.2 |
| 8,430,422 B2 * | 4/2013 | Wehner | ............ | B60R 21/231 280/730.1 |
| 8,480,125 B1 * | 7/2013 | Belwafa | ............ | B60R 21/21 280/730.2 |
| 8,622,417 B1 * | 1/2014 | Schneider | ............ | B60R 21/2338 280/729 |
| 8,789,846 B2 * | 7/2014 | Wipasuramonton | ............ | B60R 21/232 280/730.2 |

(Continued)

FOREIGN PATENT DOCUMENTS

KR 10-2004-0079246 A 9/2004
KR 10-2013-0026812 A 3/2013

(Continued)

*Primary Examiner* — Barry Gooden, Jr.
(74) *Attorney, Agent, or Firm* — Morgan, Lewis & Bockius LLP

(57) ABSTRACT

A curtain airbag for a vehicle may include a curtain airbag cushion including a rear panel disposed at a door window side of the vehicle and a front panel disposed inside the vehicle, a protrusion formed by bending the curtain airbag cushion to protrude toward the inside of the vehicle, and connections for attaching upper and lower ends of a protruding part of the protrusion.

4 Claims, 7 Drawing Sheets

(56) References Cited

U.S. PATENT DOCUMENTS

| | | | |
|---|---|---|---|
| 9,114,776 B2* | 8/2015 | Thomas | B60R 21/2338 |
| 9,227,590 B2* | 1/2016 | Fujiwara | B60R 21/23138 |
| 9,296,359 B2* | 3/2016 | Pan | B60R 21/233 |
| 9,487,179 B2* | 11/2016 | Takedomi | B60R 21/2334 |
| 9,701,272 B2* | 7/2017 | Massa | B60R 21/232 |
| 9,713,998 B2* | 7/2017 | Jaradi | B60R 21/231 |
| 9,776,593 B2* | 10/2017 | Je | B60R 21/232 |
| 9,796,349 B2* | 10/2017 | Tanaka | B60R 21/206 |
| 9,802,567 B2* | 10/2017 | Oh | B60R 21/232 |
| 2003/0132617 A1* | 7/2003 | Takimoto | B60R 21/206 280/730.1 |
| 2004/0183286 A1* | 9/2004 | Kino | B60R 21/232 280/730.2 |
| 2005/0121887 A1* | 6/2005 | Inoue | B60R 21/232 280/730.2 |
| 2005/0206138 A1* | 9/2005 | Breuninger | B60R 21/231 280/729 |
| 2006/0131847 A1* | 6/2006 | Sato | B60R 21/207 280/730.2 |
| 2007/0246920 A1* | 10/2007 | Abele | B60R 21/206 280/730.1 |
| 2010/0252350 A1* | 10/2010 | Hayashi | B60R 21/2338 180/274 |
| 2014/0239619 A1* | 8/2014 | Fukawatase | B60R 21/232 280/730.2 |
| 2014/0333053 A1* | 11/2014 | Thomas | B60R 21/2338 280/743.2 |
| 2015/0145234 A1* | 5/2015 | Wang | B60R 21/232 280/729 |
| 2015/0151708 A1* | 6/2015 | Kawamura | B60R 21/232 280/728.2 |
| 2015/0197210 A1* | 7/2015 | Abe | B60R 21/233 280/729 |
| 2015/0203066 A1* | 7/2015 | Pausch | B60R 21/231 280/730.1 |
| 2016/0031404 A1* | 2/2016 | Takedomi | B60R 21/2334 280/729 |
| 2016/0059816 A1* | 3/2016 | Je | B60R 21/232 280/730.2 |
| 2016/0107599 A1* | 4/2016 | Lee | B60R 21/232 280/730.2 |
| 2016/0107602 A1* | 4/2016 | Nakashima | B60R 21/233 280/728.2 |
| 2016/0114754 A1* | 4/2016 | Kawamura | B60R 21/2334 280/728.2 |
| 2016/0221527 A1* | 8/2016 | Sugimori | B60R 21/232 |
| 2016/0229370 A1* | 8/2016 | Hampson | B60R 21/232 |
| 2016/0280178 A1* | 9/2016 | Kruse | B60R 21/232 |
| 2017/0166158 A1* | 6/2017 | Oh | B60R 21/23138 |
| 2017/0182966 A1* | 6/2017 | Choi | B60R 21/232 |

FOREIGN PATENT DOCUMENTS

| | | |
|---|---|---|
| KR | 10-2015-0094940 A | 8/2015 |
| KR | 10-2015-0122883 A | 11/2015 |
| KR | 10-2016-0025370 A | 3/2016 |
| KR | 10-2016-0045485 A | 4/2016 |

* cited by examiner

CURTAIN AIRBAG FOR VEHICLE

CROSS-REFERENCE TO RELATED APPLICATION

The present application claims priority to Korean Patent Application No. 10-2016-0070690, filed Jun. 8, 2016, the entire contents of which is incorporated herein for all purposes by this reference.

BACKGROUND OF THE INVENTION

Field of the Invention

The present invention relates to a curtain airbag, and more particularly, to a curtain airbag for a vehicle capable of preventing hard contact between a driver and an inner component of the vehicle and injury by rotation of a head in case of oblique collision of the vehicle.

Description of Related Art

As interest in safety of a passenger as well as functionality and convenience of a vehicle is raised, importance of devices related to safety for protecting the passenger in case of an accident is gradually increased. Particularly, among safety devices for protecting passengers, an airbag system which disperses impact of the passenger upon vehicle collision, is the most fundamental protection device.

The airbag system includes various type airbags, such as, a side airbag or a curtain airbag which is deployed along side windows in preparation for side collision, as well as a front airbag for a driver seat and a passenger seat in preparation for front collision. Particularly, the airbag system related to side collision of the vehicle is classified into a curtain airbag for protecting a head part of the passenger and a side airbag for protecting a side of a chest of the passenger.

Generally, the curtain airbag cushion is mounted to extend from a front of the vehicle to a rear of the vehicle along a side of a roof panel of the vehicle. When gas is introduced into the curtain airbag cushion by an inflator, the curtain airbag cushion is deployed between door windows and the passenger, thereby protecting the head part of the passenger seated at front or rear seat.

However, upon oblique collision, a using two-dimensional plane type curtain airbag is not sufficient to protect a driver and the passenger may come into hard contact with an A pillar part of the vehicle. Additionally, in a deploying process of the front airbag, the head of the passenger slips along a surface of the front airbag and, as such, there is injury possibility of the passenger due to rotation of the head.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a curtain airbag for preventing hard contact of a head of a driver when the head falls through a space between a curtain airbag and a driver airbag upon oblique collision while preventing injury due to rotation of a head of a driver.

According to various aspects of the present invention, a curtain airbag for a vehicle may include a curtain airbag cushion including a rear panel disposed at a door window side of the vehicle and a front panel disposed inside the vehicle, a protrusion formed by bending the curtain airbag cushion to protrude toward the inside of the vehicle, and connections for attaching upper and lower ends of a protruding part of the protrusion.

The curtain airbag may further include a panel tether disposed at the door window side of the rear panel, the panel tether crossing the protrusion in a front-rear direction of the vehicle, and front and rear ends of the panel tether being fixed to the curtain airbag cushion.

The connections may be formed from the curtain airbag cushion side to a central part of the protrusion.

The front panel of the curtain airbag cushion may be formed with a longer length than the rear panel, and when an edge of the front panel and an edge of the rear panel overlap, the front panel may be folded corresponding to the length difference between the front and rear panels to protrude and form the protrusion.

The front and rear panels of the curtain airbag cushion may be formed with identical lengths, and the protrusion may be formed by bending the front and rear panels to protrude inwards and attaching the upper and lower ends of the protrusion.

The curtain airbag may further include a panel tether disposed between the front and rear panels, the panel tether crossing the protrusion in a front-rear direction of the vehicle, and front and rear ends of the panel tether being fixed to the front panel.

The protrusion may be disposed behind the front airbag upon deploying of the curtain airbag.

The front and rear panels of the curtain airbag cushion may be integrally formed as a one-piece woven (OPW) structure.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
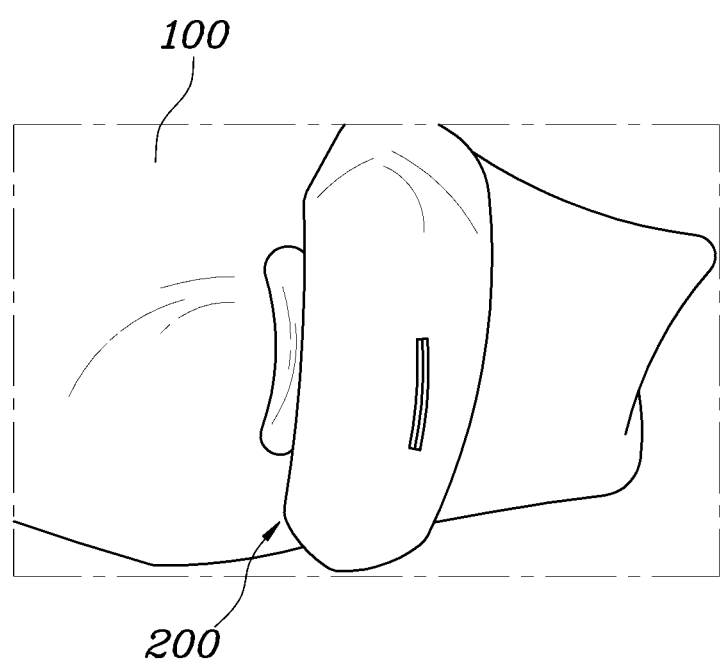
FIG. 1 is a view illustrating an deployed state of a curtain airbag cushion and a protrusion as viewed from inside of a vehicle according to various embodiments of the present invention.
Figure 2:
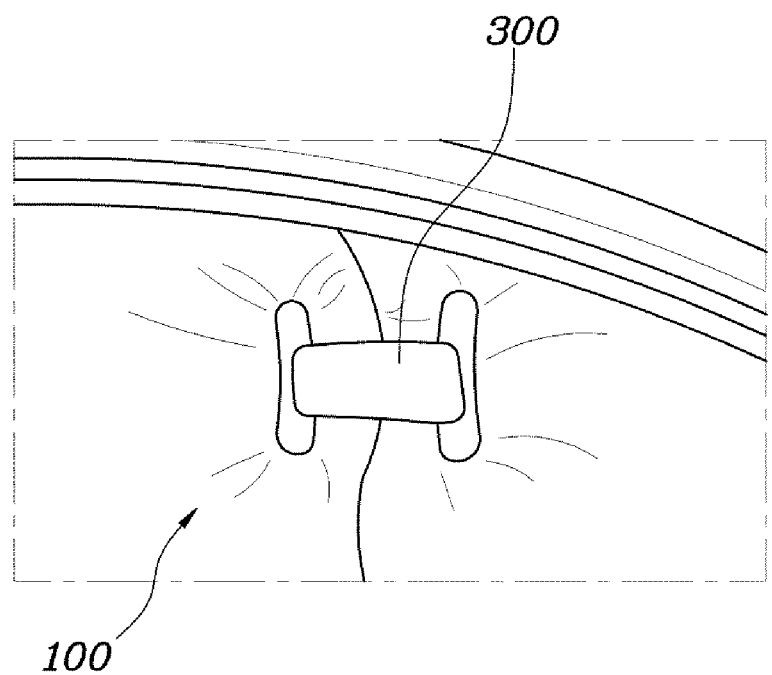
FIG. 2 is a view illustrating the deployed state of the curtain airbag cushion and protrusion as viewed from a door window side according to various embodiments of the present invention.
Figure 3:
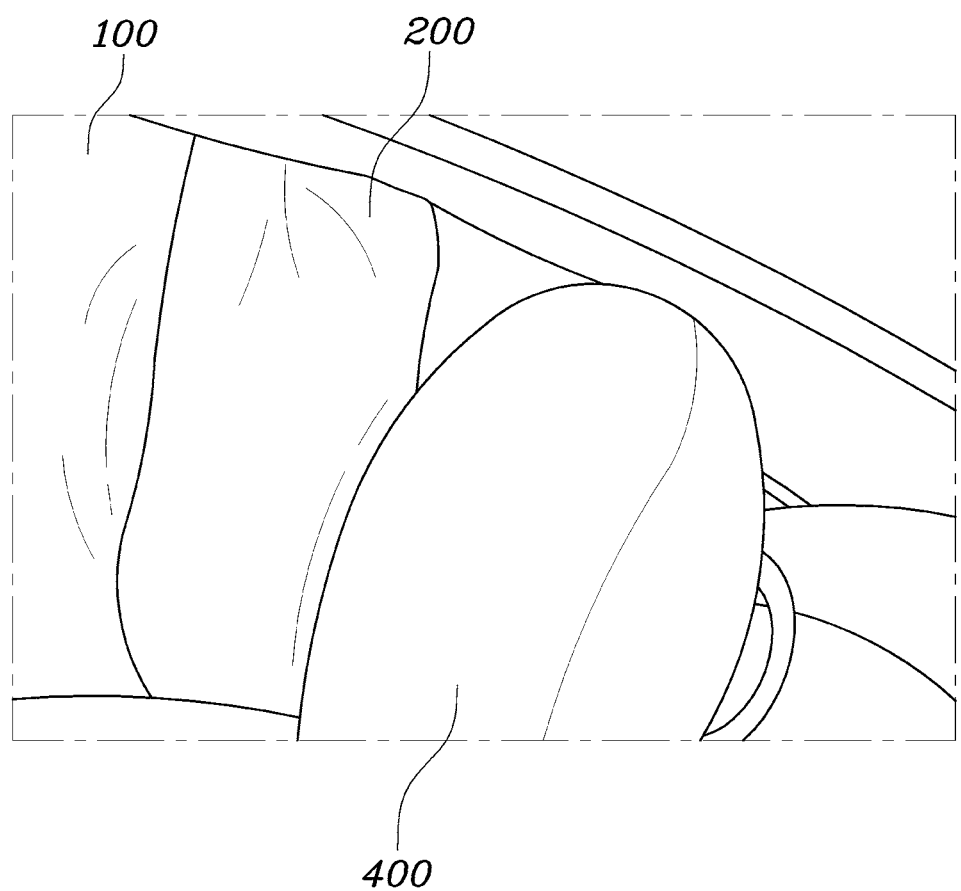
FIG. 3 is a view illustrating a configuration of the curtain airbag cushion, protrusion and front airbag according to various embodiments of the present invention.
Figure 4:
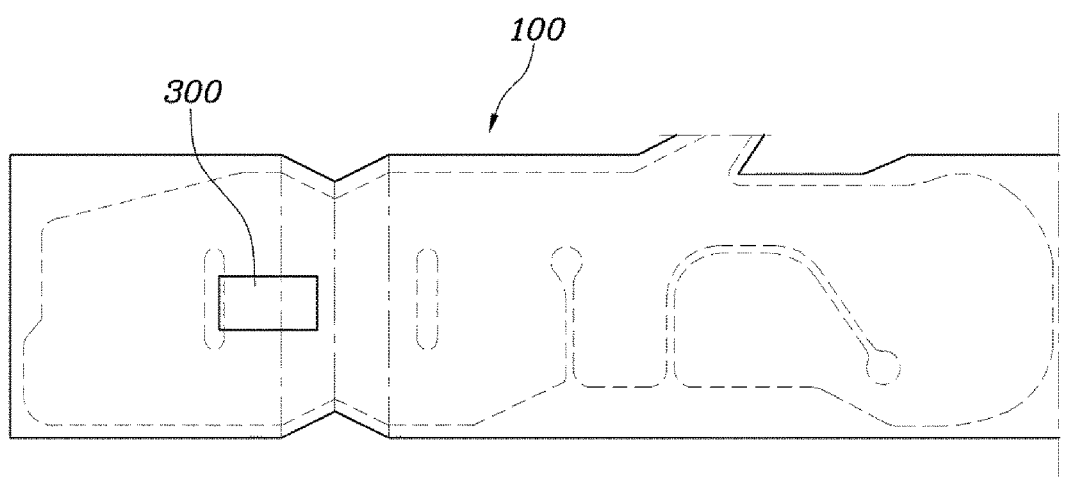
FIG. 4 is a view illustrating the curtain airbag cushion according to various embodiments of the present invention.
Figure 5:
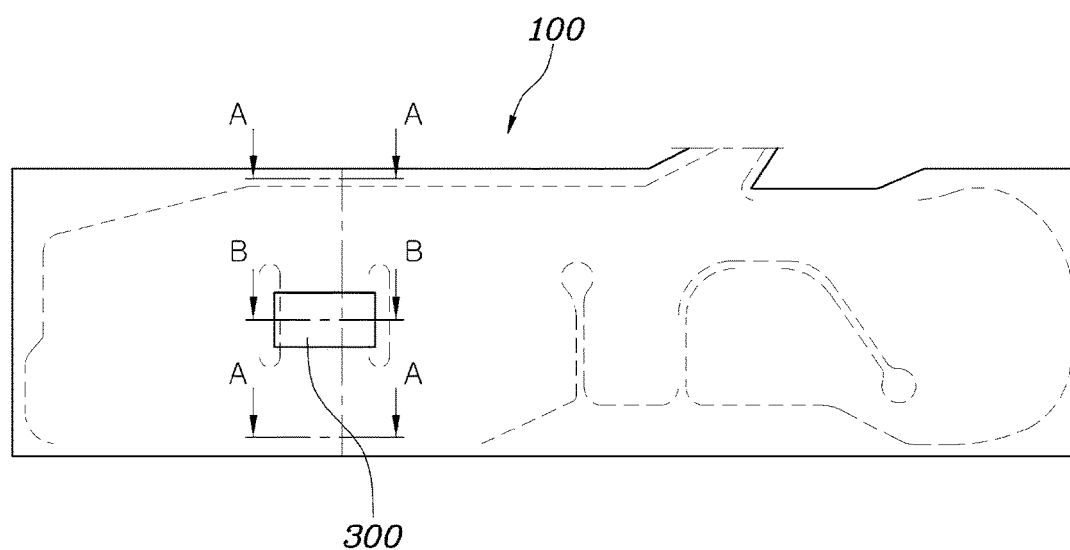
FIG. 5 is a view illustrating a panel tether connected to the curtain airbag cushion according to various embodiments of the present invention.
Figure 6:
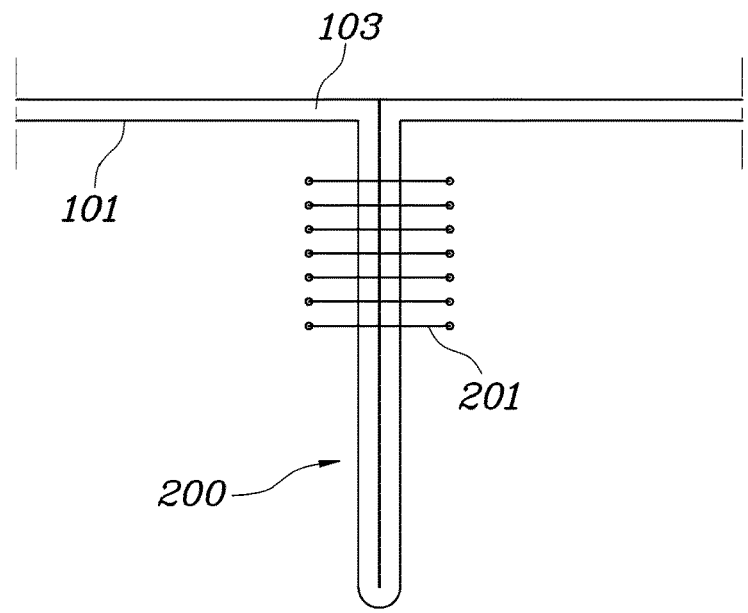
FIG. 6 is a cross-sectional view taken along line A-A of FIG. 5 according to various embodiments of the present invention.
Figure 7:
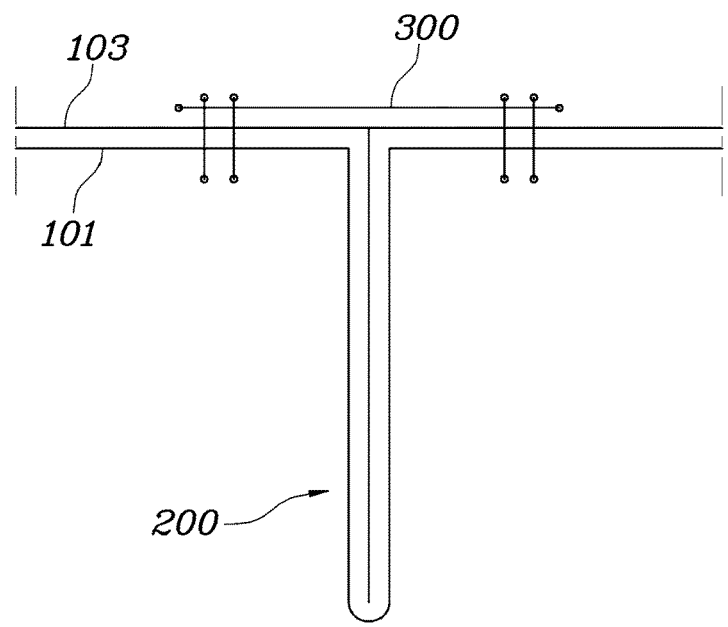
FIG. 7 is a cross-sectional view taken along line B-B of FIG. 5 according to various embodiments of the present invention.
Figure 8:
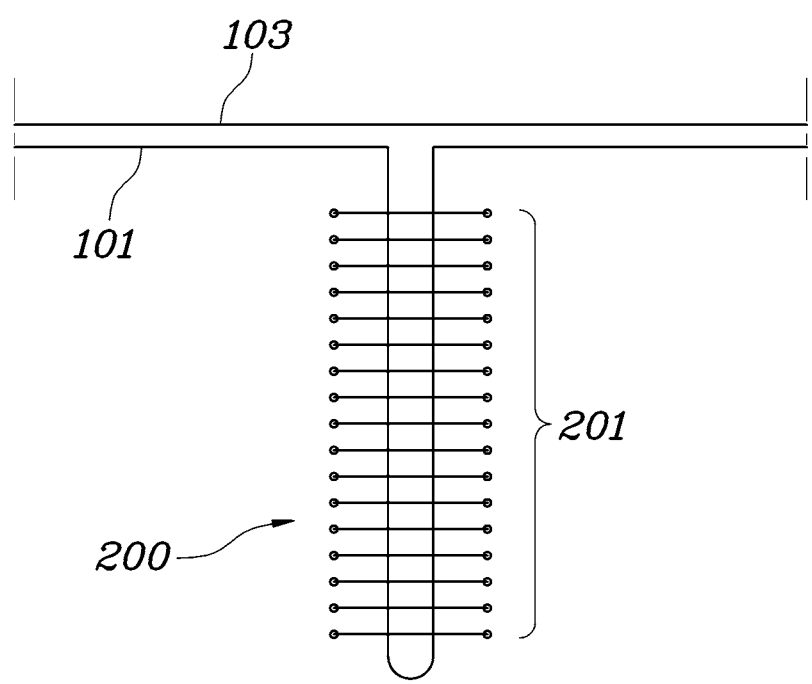
FIG. 8 is a cross-sectional view taken along line A-A of FIG. 5 according to various embodiments of the present invention.
Figure 9:
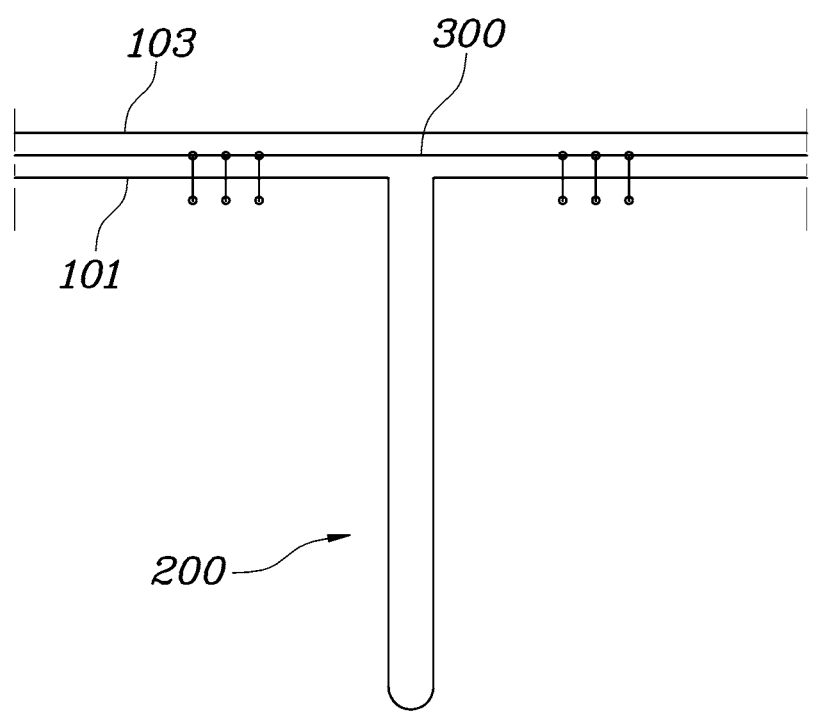
FIG. 9 is a cross-sectional view taken along line B-B of FIG. 5 according to various embodiments of the present invention.

FIG. 1 is a view illustrating an deployed state of a curtain airbag cushion and a protrusion as viewed from inside of a vehicle according to various embodiments of the present invention. FIG. 2 is a view illustrating the deployed state of the curtain airbag cushion and protrusion as viewed from a door window side according to various embodiments of the present invention. FIG. 3 is a view illustrating a configuration of the curtain airbag cushion, protrusion and front airbag according to various embodiments of the present invention. FIG. 4 is a view illustrating the curtain airbag cushion according to various embodiments of the present invention. FIG. 5 is a view illustrating a panel tether connected to the curtain airbag cushion according to various embodiments of the present invention. FIG. 6 is a cross-sectional view taken along line A-A of FIG. 5 according to various embodiments. FIG. 7 is a cross-sectional view taken along line B-B of FIG. 5 according to various embodiments of the present invention. FIG. 8 is a cross-sectional view taken along line A-A of FIG. 5 according to various embodiments of the present invention. FIG. 9 is a cross-sectional view taken along line B-B of FIG. 5 according to various embodiments of the present invention.

According to various embodiments of the present invention, the curtain airbag for the vehicle includes a curtain airbag cushion 100 including a rear panel 103 disposed at door windows of the vehicle and a front panel 101 disposed inside of the vehicle, a protrusion 200 formed by bending of the curtain airbag cushion 100 while protruding toward the inside of the vehicle, and connections 201 attaching an upper end and a lower end of a protruding part of the protrusion 200, respectively. The connections 201 may be formed from the curtain airbag cushion 100 to a central part of the protrusion 200.

Generally, a curtain airbag is longitudinally mounted from the front of the vehicle to the rear of the vehicle along a roof panel of the vehicle, such that the curtain airbag is deployed between the door windows and a passenger. The curtain airbag may prevent hard contact between a head of a passenger seated on a front seat or a rear seat and components disposed at a side of a vehicle body. Furthermore, when a door window is broken due to collision, the curtain airbag may function to prevent the passenger from being thrown out of the vehicle through the broken door window.

Conventionally, in terms of development of the airbag, airbags were developed based on front or side collision of the vehicle. Accordingly, protection of the passenger was performed through the curtain airbag and a passenger front airbag.

However, recently, in order to safely protect the passenger from the various collisions, an airbag corresponding to various collisions has been developed. For example, a curtain airbag for oblique collision, not front or side collision, has been developed.

In detail, in oblique collision, a head of a driver falls between the passenger front airbag and curtain airbag, thereby bumping against an A-pillar part of the vehicle. On the other hand, in a process of bumping the head against an end the front airbag adjacent to a door, the head is rotated by deploying pressure of the front airbag and, as such, the neck or brain may be injured. Accordingly, as illustrated in FIGS. 1 to 3 of various embodiments of the present invention, in order to prevent the head from falling between the front airbag and the curtain airbag, the protrusion 200 is provided to fill a space between the front airbag and curtain airbag, and the protrusion 200 functions as a stopper of the head not to slip along the surface of the curtain airbag cushion 100 or the front airbag.

As illustrated above, in oblique collision, collision between the driver and a component of the vehicle or injury of the neck or brain is prevented. Details of a method of forming the protrusion 200 will be described below.

The front and rear panels 101 and 103 of the curtain airbag cushion 100 are formed in an integrated manner to have a one-piece woven (OPW) structure. In the curtain airbag cushion 100, the front and rear panels 101 and 103 are formed to have identical lengths. The protrusion 200 may be formed by bending the front and rear panels 101 and 103 to protrude inwards. Then, the upper and rear ends of the protrusion 200 may be attached.

A panel tether 300, which is disposed at the door window side of the rear panel 103 and crosses the protrusion 200 in a front-rear direction of the vehicle, may be further provided. In this case, front and rear ends of the panel tether 300 are fixed to the curtain airbag cushion 100.

Although the protrusion 200 for protecting the driver upon oblique collision is provided, when a position or a thickness thereof is not optimized, the protrusion 200 may not properly receive the head due to insufficient protruding degree or the protrusion 200 may be not strong enough to support the weight of the head and, as such, the protrusion 200 may not function as a stopper of the head. Furthermore, when the protrusion 200 is formed to have heavy volume, volume of the curtain airbag cushion 100 is increased and, as such, it may be a burden on capacity of the inflator.

Accordingly, inward protruding degree of the protrusion 200 and the thickness of the protrusion 200 may be adjusted.

Protrusion degree and thickness of the protrusion 200 are diversely adjusted in accordance with manufacturing methods of the curtain airbag cushion 100. The manufacturing methods of the curtain airbag cushion 100 include the OPW method, in which the front and rear panels 101 and 103 are formed in an integrated manner, and a cut and sew method, in which the front and rear panels 101 and 103 are manufactured, respectively, and then edges of the front and rear panels 101 and 103 are sewn.

When the curtain airbag cushion 100 is manufactured by the OPW method, a body of the curtain airbag cushion 100 is bent to form the protrusion 200, and then a cross-sectional shape of the protrusion 200 is adjusted by the connections 201 connecting the upper and lower ends of the protrusion 200, respectively. The connections 201 may be formed using various methods, such as, sewing or gluing. In this case, the connections 201 attach the protrusion 200, from the upper end of the protrusion to the central part of the protrusion 200, not to the lower end of the protrusion 200. Accordingly, an inside end of the protrusion 200 is not pointed and the protrusion 200 is formed to have a pillow shape having a predetermined thickness.

Furthermore, the thickness of the protrusion 200 is limited by the panel tether 330 which is disposed at the door window side of the rear panel 103 and crosses the protrusion 200 in a front-rear direction of the vehicle, the front and rear ends of which are fixed to the curtain airbag cushion 100. When the thickness in a front-rear direction is not limited, an angle between the protrusion 200 and the curtain airbag cushion 100 is gently formed and, as such, the protrusion 200 may not properly receive the head and the head may slip over the other parts besides the curtain airbag cushion 100. Additionally, when volume of the protrusion 200 is excessively increased, deploying speed may be slow. As illustrated above, the optimized shape of the protrusion 200 for effectively receiving the head may be induced using the connections 201 of the upper and lower ends of the protrusion 200, and the panel tether 300.

Furthermore, the panel tether 330 may be applicable to the curtain airbag cushion 100 manufactured by the cut and sew method rather than the OPW method when the front and rear panels 101 and 103 have identical lengths.

When the curtain airbag cushion 100 is manufactured by the cut and sew method, formation of the connections 201 and a connecting position of the panel tether 300 may be different. In detail, the length of the front panel 101 is greater than that of the rear panel 103 in the curtain airbag cushion 100. When the edge of the front panel 101 and the edge of the rear panel 103 overlap, the front panel 101 is folded corresponding to the length difference between the front and rear panels 101 and 103 to protrude, and, as such, the protrusion 200 may be formed. A panel tether 300 which is disposed between the front and rear panels 101 and 103 and crosses the protrusion 200 in a front-rear direction of the vehicle, the front and rear ends of which are fixed to the front panel 101, may be further provided.

In this case, substantially, the rear panel 103 which protrudes inwards to contact with the head of the passenger may be formed to have a longer length. As a result, manufacture material amount of the curtain airbag cushion 100 may be decreased. Additionally, as the panel tether 300 is directly woven into the front panel 101 to be fixed, a width of the protrusion 200 may be exactly determined.

Upon deploying the curtain airbag, the protrusion 200 may be disposed behind the front airbag 400.

The protrusion 200 is disposed behind the front airbag 400, that is, is disposed adjacent to the front of the passenger, and, as such, when the head is received by the protrusion 200, bearing capacity of the protrusion 200 may be obtained from the front airbag 400.

As apparent from the above description, in accordance with various embodiments of the present invention, even in oblique collision, direct contact between the head of the passenger and a frame of the vehicle may be prevented. Furthermore, slip of the head along the front airbag and rotation of the head may be prevented and, as such, injury of the passenger may be reduced.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A curtain airbag for a vehicle comprising:
   a curtain airbag cushion comprising a rear panel disposed at a door window side of the vehicle and a front panel disposed inside the vehicle;
   a protrusion formed by bending the curtain airbag cushion to protrude toward the inside of the vehicle;
   connections for attaching upper and lower ends of a protruding part of the protrusion; and,
   a panel tether disposed at the door window side of the rear panel, the panel tether crossing the protrusion in a front-rear direction of the vehicle, and front and rear ends of the panel tether being fixed to the curtain airbag cushion;
   wherein the front panel of the curtain airbag cushion is formed with a length longer than the rear panel; and
   wherein when an edge of the front panel and an edge of the rear panel overlap, the front panel is folded corresponding to a length difference between the front and rear panels to protrude and form the protrusion.

2. The curtain airbag according to claim 1, wherein the protrusion is disposed behind a front airbag from a viewpoint of a front of the vehicle upon deploying of the curtain airbag.

3. A curtain airbag cushion comprising:
   a curtain airbag cushion comprising a rear panel disposed at a door window side of the vehicle and a front panel disposed inside the vehicle;
   a protrusion formed by bending the curtain airbag cushion to protrude toward the inside of the vehicle;
   connections for attaching upper and lower ends of a protruding part of the protrusion; and,
   a panel tether disposed between the front and rear panels, the panel tether crossing the protrusion in a front-rear direction of the vehicle, and front and rear ends of the panel tether being fixed to the front panel;
   wherein the front panel of the curtain airbag cushion is formed with a length longer than the rear panel; and wherein when an edge of the front panel and an edge of the rear panel overlap, the front panel is folded corresponding to a length difference between the front and rear panels to protrude and form the protrusion.

4. The curtain airbag according to claim 3, wherein the protrusion is disposed behind a front airbag from a viewpoint of a front of the vehicle upon deploying of the curtain airbag.

* * * * *